United States Patent Office 3,780,083
Patented Dec. 18, 1973

3,780,083
PROCESS FOR PREPARING α-MONO-
CYANOETHYLATED BUTANONE
Johannes J. M. Deumens, Geleen, and Petrus A. M. J.
Stijfs, Oirsbeek, Netherlands, assignors to Stamicarbon
N.V., Heerlen, Netherlands
No Drawing. Filed Feb. 14, 1972, Ser. No. 226,319
Claims priority, application Netherlands, Feb. 19, 1971,
7102202
Int. Cl. C07c 121/02, 121/34
U.S. Cl. 260—465.1    8 Claims

ABSTRACT OF THE DISCLOSURE

Schiff bases derived from butanone and an aliphatic primary amine are catalysts in the preparation of α-mono-cyanoethylated butanone by reacting acrylonitrile with at least an equimolar quantity of acrylonitrile in the presence of an acid. The α-mono-cyanoethylated butanones, such as 4-methyl-5-oxohexane nitrile and 5-oxoheptane nitrile are produced with only minor amounts of contaminant's that are easily removed. The α-mono-cyanoethylated butanones are useful for the preparation of diamines, ketocarboxylic acids or keto-amides.

---

It has now been found that, in the preparation of α-mono-cyanoethylated butanone according to the process of U.S. 2,850,519 with cyclohexylamine as the catalyst, the reaction product obtained is highly contaminated with compounds which can only be removed with difficulty and cost, and that recovery of cyclohexylamine, as such, or as Schiff base, is not possible in an economical manner. Several other primary amines, such as n-dodecylamine, tetramethylene diamine 2- and 4-methylcyclohexylamine, hexamethylene diamine, benzylamine, aniline, ortho-, meta- and para-toluidine, phenylene diamine and benzidine, appear to have the same disadvantages as cyclohexylamine in the above described process.

We have now found that in the preparation of α-mono-cyanoethylated butanone these disadvantages can be avoided by applying as catalyst a Schiff base but having a boiling point of less than 150° C. and more than about 80° C. being derived from butanone and from an aliphatic primary amine, or a mixture of such a Schiff base and the amine derived therefrom.

The invention therefore, provides a process for preparing α-mono-cyanoethylated butanone by liquid-phase reaction of acrylonitrile with at least an equimolar quantity of butanone in the presence of an acid with, as a catalyst, a primary amine or a Schiff base and separating the α-mono-cyanoethylated butanone product from the reaction mixture by distillation, the improvement comprising using, as the catalyst, a Schiff base derived from butanone and a primary amine, having a boiling point of less than about 150° C., of the formula

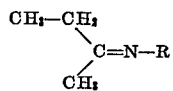

wherein R is a lower alkyl group, or a mixture of said Schiff base and the amine of the formula:

wherein R has the meaning given above.

As used herein lower alkyl group contains from 1 to 6 carbon atoms.

The reaction mixture obtained in the process according to the invention can very suitably be separated by distillation into an α-mono-cyanoethylated butanone fraction and a catalyst-containing fraction which, together with non-consumed reactants, can be recycled. The α-mono-cyanoethylated butanone thus removed appears to be a mixture of 4-methyl-5-oxohexane nitrile and 5-oxoheptane nitrile. If desired, this mixture, containing namely 5-methyl-5-oxohexane nitrile, may be separated, for intsance by fractional distillation. However, the mixture of nitriles as such may also be applied as starting product for subsequent syntheses, for instance saponification into a mixture of ketocarboxylic acids which can subsequently be separated.

The process according to the invention may be carried out with various Schiff bases of butanone according to the formula:

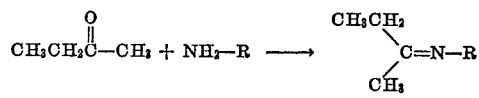

wherein R of the primary amine is a lower alkyl group of from 1 to 6 carbon atoms.

Among the primary amines that may be employed are methyl amine, ethyl amine, n-propyl amine, isopropyl amine, n-butyl amine, isobutyl amine, secondary butyl amine and secondary pentyl amine as primary amines. N-isopropyl-butanonimine and N-secondary-butyl-butanonimine are preferred.

According to the process of the present invention the catalyst quantity may be widely varied, for instance 0.005–0.5 mole of catalyst to every mole of acrylonitrile to be converted. For practical purposes an amount of 0.01–0.2 mole of catalyst to every mole of acrylonitrile to be converted is the most suitable. In addition to the catalyst, a small quantity of an acid or acid compound should be present in the reaction mixture. As used herein the term "an acid" includes organic inorganic and compounds acid in character. As is the case in the known process mentioned above, both organic and inorganic mineral acids or compounds having an acid character in the reaction medium are suitable for that purpose. Preference is given to benzoic acid, although it is to be understood that the presence of the acid compound is optional.

In the process according to the present invention it is not necessary for the Schiff base to be added as such to the reaction medium. The Schiff base can also be formed in situ in the reaction medium by reaction of butanone with the primary amine of a lower alkyl group, as described above, or with the corresponding Schiff base of another ketone, such as ketones having lower alkyl groups having from 1 to 6 carbon atoms, the lower alkyl groups being the same or different, attached to the carbonyl carbon.

In the process according to the present invention at least 1 mole of butanone is applied per mole of acrylonitrile. Preferably, from about 2 to about 10 moles of butanone are applied per mole of acrylonitrile. The conversion of the acrylonitrile may be varied, preference being given to keeping the conversion of the acrylonitrile below 90% because it has appeared that, owing to the longer reaction time and/or the higher temperature that is necessary to achieve a conversion of more than 90%, the formation of undesirable by-products is promoted.

The process according to the invention is preferably carried out between 75 and 225° C. Below 75° C. the reaction proceeds at too slow a rate, while above 225° C. side-reactions occur having an adverse effect on the efficiency of the overall reaction. Preferably the temperature is maintained at about 125 to about 200° C. The pressure employed can be either above or below atmospheric pressure, but is not critical and may be varied. The pressure should, of course, be so chosen, in connection with the temperature, that the reaction can take place in a liquid medium, whether or not in the presence of a solvent. The products are valuable intermediates for the preparation of diamines, by hydrogenation in the presence of ammonia, which are in turn starting products for the preparation of pyridines or piperidines. Further ketocarboxylic acids can be obtained by saponification of the oxonitriles. By partial saponification of the oxonitriles it is able to produce ketoamides, which may be converted into a lactam.

The process according to the invention will be further described in more detail in the following examples, the following non-limiting examples unless otherwise indicated all parts and percentages are by weight.

EXAMPLE I

Butanone (216 g.), acrylonitrile (31.8 g.) and of benzoic acid (0.2 g.) are transferred to a 1 liter autoclave. The mixture in the autoclave is subsequently heated to 150° C. at autogenous pressure, whereupon within 3 minutes a solution consisting of isopropyl amine (2.5 g.) benzoic acid (0.1 g.) and butanone (43.2 g.) is pumped into the autoclave and the reaction mixture obtained is kept to 150° C. for 2 hours. Subsequently, the reaction mixture is rapidly cooled, the autoclave opened and the reaction mixture transferred to a distilling flask. By distillation at atmospheric pressure the reaction mixture is separated into 256 g. of distillate boiling below 125° C. and 35.3 g. of residue.

According to gaschromatographic analysis, the distillate contains 235 g. of butanone, 16.9 g. of acrylonitrile and 2.7 g. of N-isopropyl-butanonimine and, as the residue, 29.4 g. of 4-methyl-5-oxohexane nitrile, 3.2 g. of 5-oxoheptane nitrile and 0.7 g. of (2-cyanoethyl)-isopropyl amine. The distillate may contain some water as a result of the formation of a Schiff base from the amine and of aldol condensation. The water may be conveniently removed from the distillate, for instance, by means of a molecular sieve, so that, upon recirculation of the distillate, too high a water content of the reaction mixture is avoided.

Of the total quantity of acrylonitrile 47% has been converted. The 4-methyl-5-oxohexane nitrile efficiency amounts to 83.6% referred to the acrylonitrile converted, and to 9.1% referred to the 5-oxoheptane nitrile. Calculated on the butanone converted, these efficiencies amount to 75.3 and 8.1% respectively. Of the 2.5 g. of isopropyl amine consumed a portion is recovered as N-isopropyl butanonimine in the distillate so that 33.5 milligrams of isopropyl amine have been consumed per gram of γ-cyanoketone obtained. By fractional distillation of the residue a fraction of 31.8 g. having a boiling point of 71–73° C. at 0.7 mm. Hg is obtained which according to mass-spectrometric analysis contains 89% by weight of 4-methyl-5-oxohexane nitrile and 8% by weight of 5-oxoheptane nitrile.

EXAMPLE II

Butanone (1728 g.) acrylonitrile (212 g.), isopropyl amine (25 g.) and benzoic acid (0.8 g.) are transferred to a 5-liter autoclave. The mixture is maintained to a temperature of 160° C. for 2 hours at autogeneous pressure, whereupon the reaction mixture is cooled rapidly and transferred to a distilling flask. By distillation at atmospheric pressure the reaction mixture is separated into 1677 g. of distillate boiling below 125° C. and 284 g. of residue.

According to gaschromatographic analysis the distillate 1544 g. of butanone, 91 g. of acrylonitrile and 34.2 g. of N-isopropyl-butanonimine.

According to gaschromatographic analysis the residue contains 228.2 g. of 4-methyl-5-oxohexane nitrile, 23.1 g. of 5-oxoheptane nitrile, 9 g. of (2-cyanoethyl)-isopropyl amine and 20 g. of di-cyanoethylated butanone.

Of the total quantity of acrylonitrile 57% has been converted. Of the converted acrylonitrile and the converted butanone, 80% have reacted into 4-methyl-5-oxohexane nitrile and 8% into 5-oxoheptane nitrile. For every gram of γ-cyanoketone obtained 28 milligrams of isopropyl amine has been consumed.

By fractionating distillation of the residue a main fraction of 233 g. having a boiling point of 56–57° C. at 0.2 mm. Hg is obtained, which, according to gaschromatographic analysis, contains 89.5% by weight of 4-methyl-5-oxohexane nitrile and 9% by weight of 5-oxoheptane nitrile.

EXAMPLE III

Butanone (288 g.), acrylonitrile (53 g.) secondary-butyl amine (4 g.) and benzoic acid (0.3 g.) are transferred to a 1 liter autoclave, whereupon the mixture is heated at autogeneous pressure for 2.5 hours at 175° C. Next, the reaction mixture is cooled, the autoclave opened and the reaction mixture transferred to a distilling flask.

In order for the reaction mixture to be transferred to the distilling flask as completely as possible, the autoclave is flushed with butanone, which causes the quantity of butanone in the distilling flask to increase by 10 grams. By distillation at atmospheric pressure, the mixture is then separated into 249.5 g. of distillate boiling below 140° C. and 101 g. of residue. The distillate obtained contains 234 g. of butanone, 9 g. of acrylonitrile and 2.7 g. of N-secondary-butyl-butanonimine.

The residue contains 74.7 g. of 4-methyl-5-oxohexane nitrile and 14.5 g. of 5-oxoheptane nitrile. 83% of the total acrylonitrile quantity has been converted. The 4-methyl-5-oxohexane nitrile efficiency amounts to 72% referred to the converted acrylonitrile, and to 69% referred to the converted butanone. The 5-oxoheptane nitrile efficiency amounts to 14% referred to the converted acrylonitrile, and to 13% referred to the converted butanone. To every gram of cyanoethylated ketone obtained 28 milligrams of secondary-butyl amine have been consumed.

We claim:

1. In a process for producing α-mono-cyanoethylated butanone by liquid-phase reaction of acrylonitrile with one up to 10 moles of butanone per mole of acrylonitrile in the presence of an acid and at a temperature of about 75° C. to about 225° C. with, as a catalyst, a primary amine or a Schiff base and separating the α-mono-cyanoethylated butanone product from the reaction mixture by distillation, the improvement comprising using, as the catalyst from 0.005–0.5 mole for each mole of acrylonitrile to be converted, a Schiff base derived from butanone and a primary amine, having a boiling point of less than about 150° C., and having the formula:

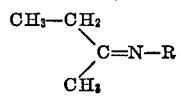

wherein R is a lower alkyl group having from 1–6 carbon atoms.

2. Process according to claim 1, said Schiff base is N-isopropyl-butanonimine or N-secondary-butyl-butanonimine.

3. Process according to claim 1 wherein said α-mono-cyanoethylated butanone is 4-methyl-5-oxohexane nitrile, 5-oxoheptane nitrile or a mixture thereof.

4. Process according to claim 1 wherein said Schiff base is formed in situ by reaction with the butanone and a primary amine of the formula R—NH₂.

5. Process according to claim 1 wherein from 0.01 to 0.2 mole of said catalyst is used for each mole of acrylonitrile to be converted.

6. Process according to claim 1 the reaction is conducted at a temperature of from about 125° C. to about 200° C.

7. Process according to claim 1 wherein said Shiff base has a boiling point between 80 and 150° C.

8. A process for producing α-mono-cyanoethylated butanone comprising:

(a) reacting in the liquid phase acrylonitrile with from one to ten moles of butanone per mole of acrylonitrile at a temperature of about 75° C. to about 225° C. in the presence of an acid and from 0.005 to 0.5 mole for each mole of acrylonitrile to be converted of a catalyst, said catalyst being a Schiff base derived from butanone and a primary amine having a boiling point between about 80 and 150° C. and having the formula:

(i) 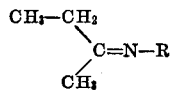

wherein R is alkyl of 1–6 carbon atoms,
(b) separating by distillation the reaction mixture into two portions, a α-mono-cyanoethylated butanone product and a portion of the reaction mixture containing said catalyst;
(c) reusing the catalyst portion of the reaction mixture separated in step (b) in reaction step (a).

References Cited
UNITED STATES PATENTS

| | | | |
|---|---|---|---|
| 2,850,519 | 9/1958 | Krimm | 260—465.1 X |
| 3,686,262 | 8/1972 | Groen et al. | 260—465.1 |
| 3,577,455 | 5/1971 | Jones et al. | 260—465.1 |
| 3,632,625 | 1/1972 | Aus der Funten et al. | 260—465.1 |

JOSEPH PAUL BRUST, Primary Examiner